(12) United States Patent
Wu et al.

(10) Patent No.: US 7,379,461 B2
(45) Date of Patent: May 27, 2008

(54) SYSTEM AND METHOD FOR INDICATING NETWORK QUALITY OF SERVICE CAPABILITY AS A PRESENCE ATTRIBUTE OF AN END-USER

(75) Inventors: Fuming Wu, Frisco, TX (US); Aziz Mohammed, Plano, TX (US)

(73) Assignee: Alcatel Lucent, Paris (FR)

( * ) Notice: Subject to any disclaimer, the term of this patent is extended or adjusted under 35 U.S.C. 154(b) by 792 days.

(21) Appl. No.: 10/832,011

(22) Filed: Apr. 26, 2004

(65) Prior Publication Data

US 2005/0238026 A1    Oct. 27, 2005

(51) Int. Cl.
*H04L 12/28* (2006.01)
*H04L 12/56* (2006.01)

(52) U.S. Cl. .................. 370/395.2; 370/389; 370/392; 370/375.43

(58) Field of Classification Search ...................... None
See application file for complete search history.

(56) References Cited

U.S. PATENT DOCUMENTS

| 6,985,921 | B2* | 1/2006 | Covelli et al. | 709/203 |
|---|---|---|---|---|
| 7,151,781 | B2* | 12/2006 | MeLampy et al. | 370/468 |
| 2003/0120773 | A1 | 6/2003 | Mueller et al. | |
| 2004/0003070 | A1* | 1/2004 | Fernald et al. | 709/223 |
| 2004/0083291 | A1* | 4/2004 | Pessi et al. | 709/227 |
| 2005/0078689 | A1* | 4/2005 | Sharma et al. | 370/401 |
| 2005/0259679 | A1* | 11/2005 | Chowdhury et al. | 370/465 |
| 2007/0150619 | A1* | 6/2007 | Land et al. | 709/246 |

FOREIGN PATENT DOCUMENTS

| EP | 1 024 638 A1 | 1/2000 |
|---|---|---|
| EP | 1 107 538 A2 | 6/2001 |
| EP | 1 148 688 A1 | 10/2001 |
| WO | WO 99/53719 | 10/1999 |
| WO | WO 02/03647 A1 | 1/2002 |
| WO | WO 02/093959 A1 | 11/2002 |

OTHER PUBLICATIONS

Schulzrinne, et al.; RPIDS—Rich Presence Information Data Format for Presence Based on the Session INitiation Protocol (SIP); IETF Internet Draft; Feb. 18, 2003; pp. 1-21; draft-schulzrinne-simple-ripds-01.txt.
3GPP: 3rd Generation Partnership Project; Technical Specification Group Services and System Aspects; Presence Service; Architecture and Functional Description (Release 6)); 3GPP TS 23,141 V0.0.0; Jun. 2002; pp. 1-33.

* cited by examiner

*Primary Examiner*—Ronald Abelson

(57) ABSTRACT

System and method for indicating network quality of service capability as a presence attribute of an end-user are described. One embodiment is an access network for providing quality of service ("QoS") information of the access network. The access network comprises an Application Quality of Service ("AQS") device that controls QoS parameters for the access network; a presence server that develops a QoS attribute of an end-user of the access network by collecting QoS attributes of the access network from the AQS device and collecting QoS attributes of an end-user device; and a Session Initiation Protocol ("SIP") server that communicates with the presence server to collect the QoS attribute of the end-user and communicates the QoS attribute to an edge router of another access network.

26 Claims, 5 Drawing Sheets

SYSTEM AND METHOD FOR INDICATING NETWORK QUALITY OF SERVICE CAPABILITY AS A PRESENCE ATTRIBUTE OF AN END-USER

BACKGROUND OF THE INVENTION

1. Technical Field of the Invention

The present invention generally relates to presence. More particularly, and not by way of any limitation, the present invention is directed to system and method for indicating network quality of service ("QoS") capability as an end-user presence attribute.

2. Description of Related Art

With today's widespread use of the Internet as a major communication medium, data communication devices are now being designed so that they are capable of communicating over packet-switched networks. For instance, telephones, pagers, personal digital assistant devices, cell phones, handheld computers, and even fax machines can now be accessed and controlled from the Internet. Communication over a packet-switched network using communication devices that traditionally communicate over a circuit-switched telecommunications network is generally known as network telephony, or IP telephony when an IP network is involved.

Various types of user communication devices (e.g., a cell phone, laptop or handheld PC, desktop PC, and the like) can identify themselves to the network using a suitable identifier (e.g., username@company.com). "Presence" refers to, for example, the availability, proximity, activity level or operating state of a user on a network. The ability for users to monitor each other's presence is a feature offered in connection with many applications that support network telephony. For example, instant messaging applications such as MSN® or Yahoo® have an "available buddy" feature, in which a user of the application can determine whether select users are available for engaging in communication. The data retrieved and returned to the buddy list, e.g. "John OFFLINE" or "Susan ACTIVE", is known as "presence information," and is generally maintained by a presence server in the data network, often a dedicated server. Typically, the presence server supports network telephony protocols such as the Session Initiation Protocol (SIP). Users can register their communication devices with the presence server in order to have their presence maintained and to allow various programs on the network to facilitate network telephony services. A first device user wishing to detect the presence of a second device user does so by "subscribing" with the presence server, such as via a SIP SUBSCRIBE message. The presence server intermediates between the first device user (also known as the watcher or subscriber) and the second device user to facilitate the communication of the second device user's presence information to the first device user.

Additional details about presence and presence modeling are set forth in the Internet Engineering Task Force (IETF) Request for Comment (RFC) 2778 entitled "A model for Presence and Instant Messaging," dated February 2002; RFC 2779 entitled "Instant Messaging/Presence Protocol Requirements," dated February 2002; and Internet-Draft identified as <<draft-schulzrinne-simple-rpids-01.ps>> and entitled "RPIDS—Rich Presence Information Data Format for Presence Based on the Session Initiation Protocol (SIP)," dated Feb. 18, 2003, which are incorporated herein by reference.

It is commonly known that real-time multimedia interactive communications are very sensitive to the Quality of Service ("QoS") provided by the underlying converged IP network. For example, applications such as on-line gaming and voice-over-IP ("VoIP") cannot be reliably offered as a revenue generating service without being able to provision the network for meeting the bandwidth, delay, and jitter requirements of such traffic.

Presence-based personal communication is gaining momentum. Currently, commercial systems implementing presence-based communication technology revolve around simple "buddy list" attributes that display the availability of the communicating parties. Trends in next-generation systems are quickly evolving into a rich presence-enabled communication where general capabilities, device information, and other environments of the buddies are becoming important presence attributes. None of today's definitions of rich presence information explicitly consider network QoS capability as an attribute. Before a caller initiates a session of an application like on-line gaming and VoIP, he must attempt to infer the QoS capability of the callee access network from information such as the callee's device type and the wired/wireless attachment of the end system to the network. This is by no means an accurate indicator of the QoS state of the underlying IP network between the caller and the callee.

Currently, there are basically three solutions to this problem. In a presence-based communication environment, the watcher tries to infer the QoS capability of the presentity from the end-system information, such as terminal type and the terminal attachment to the network as wired/wireless. In a non-presence-based communication environment, end-users typically have to negotiate for network QoS using complex protocols, like RSVP. Finally, the most common practice is to initiate the communications session and hope for the best.

Each of the so-called "solutions" set forth above suffer deficiencies. The first does not in any way take into account the QoS capability of the network itself. The second has been found not to be widely deployable because of its complexity. Moreover, even if it were to be deployed, the QoS information resulting from the solution is not available before the initiation of the session. The third will work only in an over-provisioned network; otherwise, it is very difficult to deploy a reliable service over such a system.

SUMMARY OF THE INVENTION

Therefore, the present invention is directed to a mechanism for defining and indicating the QoS capability of the presentity to the watcher as a presence attribute. One embodiment is an access network for providing quality of service ("QoS") information of the access network. The access network comprises an Application Quality of Service ("AQS") device that controls QoS parameters for the access network; a presence server that develops a QoS attribute of an end-user of the access network by collecting QoS attributes of the access network from the AQS device and collecting QoS attributes of an end-user device; and a server (e.g., based on SIP) that communicates with the presence server to collect the QoS attribute of the end-user and communicates the QoS attribute to an edge router of another access network.

Another embodiment is a method of providing quality of service ("QoS") information of an access network. The method comprises collecting QoS attributes of the access network from an Application Quality of Service ("AQS")

device that controls QoS parameters for the access network; collecting QoS attributes of an end-user device; developing a QoS attribute of an end-user of the access network using the collected QoS attributes; and communicating the developed QoS attribute of the end-user to an edge router of another access network.

Another embodiment is a system for providing quality of service ("QoS") information of an access network. The system comprises means for collecting QoS attributes of the access network from an Application Quality of Service ("AQS") device that controls QoS parameters for the access network; means for collecting QoS attributes of an end-user device; means for developing a QoS attribute of an end-user of the access network using the collected QoS attributes; and means for communicating the developed QoS attribute of the end-user to an edge router of another access network.

Another embodiment is a Session Initiation Protocol ("SIP") server for providing quality of service ("QoS") information of an access network. The SIP server comprises core SIP server functionality; a Simple Network Management Protocol ("SNMP") client/server ("C/S") for communicating with the core SIP server functionality; and a Common Open Policy Services protocol ("COPS") client for communicating with the core SIP server functionality.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
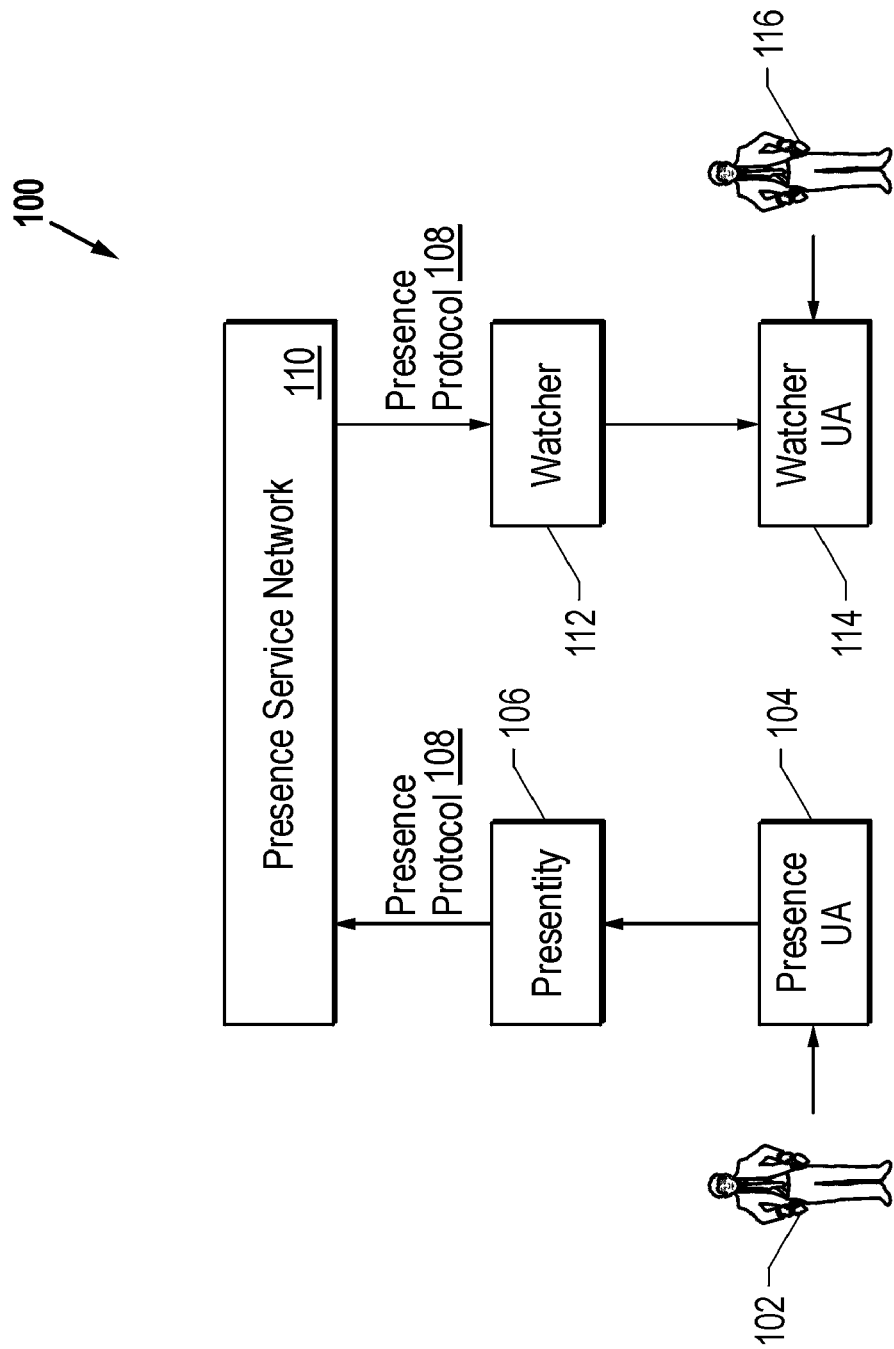
FIG. 1 depicts a conventional presence application system.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is a conventional presence application system 100 where a Sender Principal 102 interfaces with a presence user agent (UA) 104 for transmitting presence information regarding a presentity 106. An application-specific presence protocol 108 is used for providing presence information to a presence service network (PSN) 110 that is embodied as an IP-based communications network. At the other end of transmission, a watcher 112 obtains the presence information using the presence protocol 108, which is provided to a Receiver Principal 116 who interfaces with a watcher user agent (UA) 114 for controlling the watcher 112.

Figure 2:
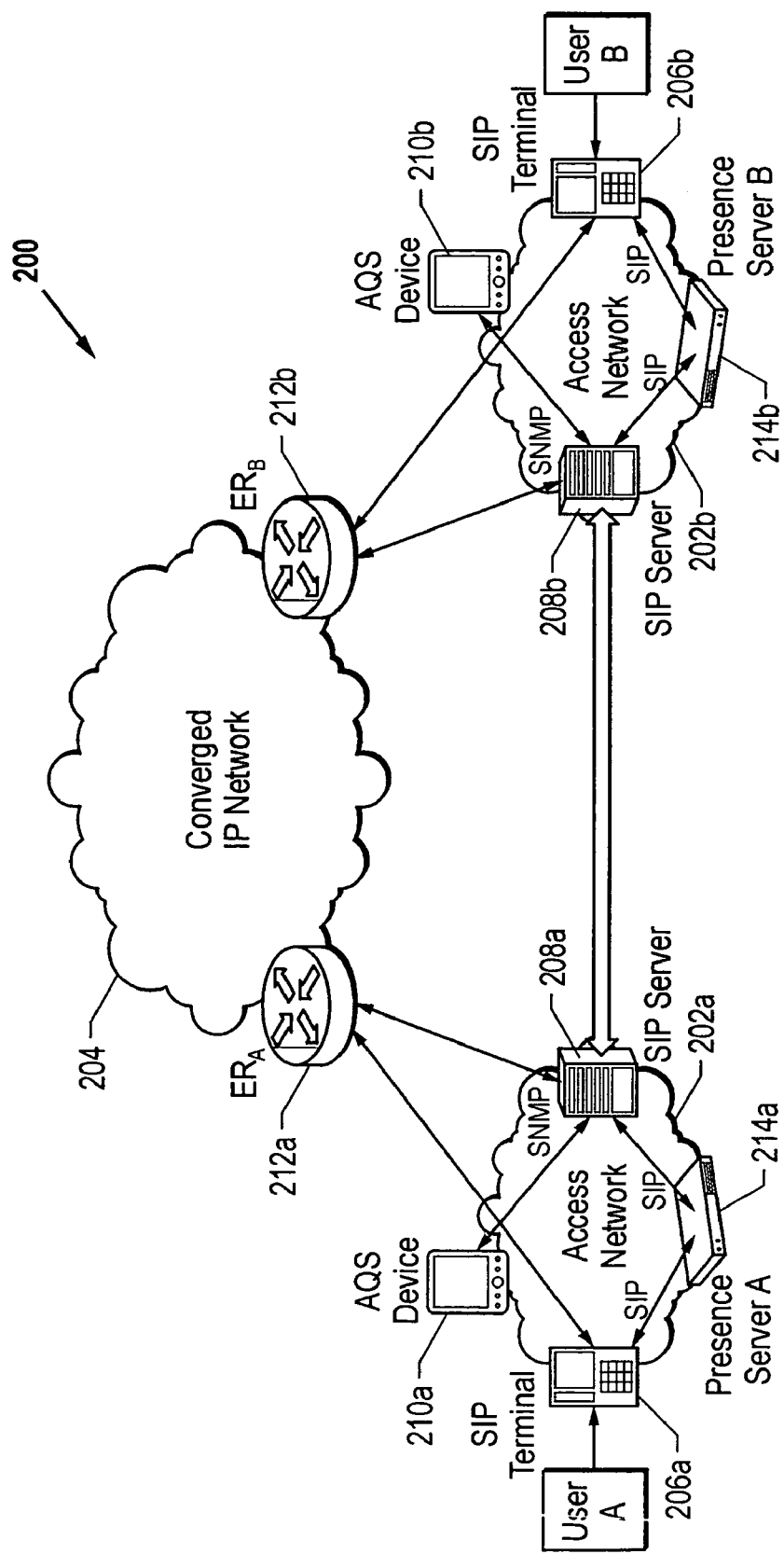
FIG. 2 depicts an end-to-end network communications scenario between two users.

FIG. 2 is a schematic block diagram of an end-to-end communication system 200 between a first user, designated User A, and a second user, designated User B, across two access networks 202a, 202b, and a converged core network 204. The access networks 202a, 202b, are assumed to be administrable by a single service provider, such as an Internet Telephony Service Provider ("ITSP") for VoIP service. The involved actors in the illustrated scenario include two SIP clients 206a, 206b, two enhanced SIP proxy servers 208a, 208b, two AQS devices 210a, 210b, and the converged core network 204. The QoS characteristics of the converged core network 204 may be accessed at the border of the network from edge routers ("ERs") 212a, 212b.

In the access networks 202a, 202b, QoS is set up by a software component in the AQS devices 210a, 210b, running to automate the network-wide QoS configuration and to provision the QoS parameters as bandwidth, delay, jitter, packet loss ratio, etc. This component also monitors the QoS-enabled network 204 and issues alerts in response to preassigned threshold values of the network QoS state. Presently, products are commercially available from such manufacturers as Alcatel, under the name OneTouch QoS, and Cisco, under the name AutoQoS, to configure their respective network gears for VoIP applications. With time, it is conceivable that third-party vendors will develop tools on tope of these products in order to enable multi-vendor QoS configuration across an access network and for applications that go beyond VoIP.

Figure 3:
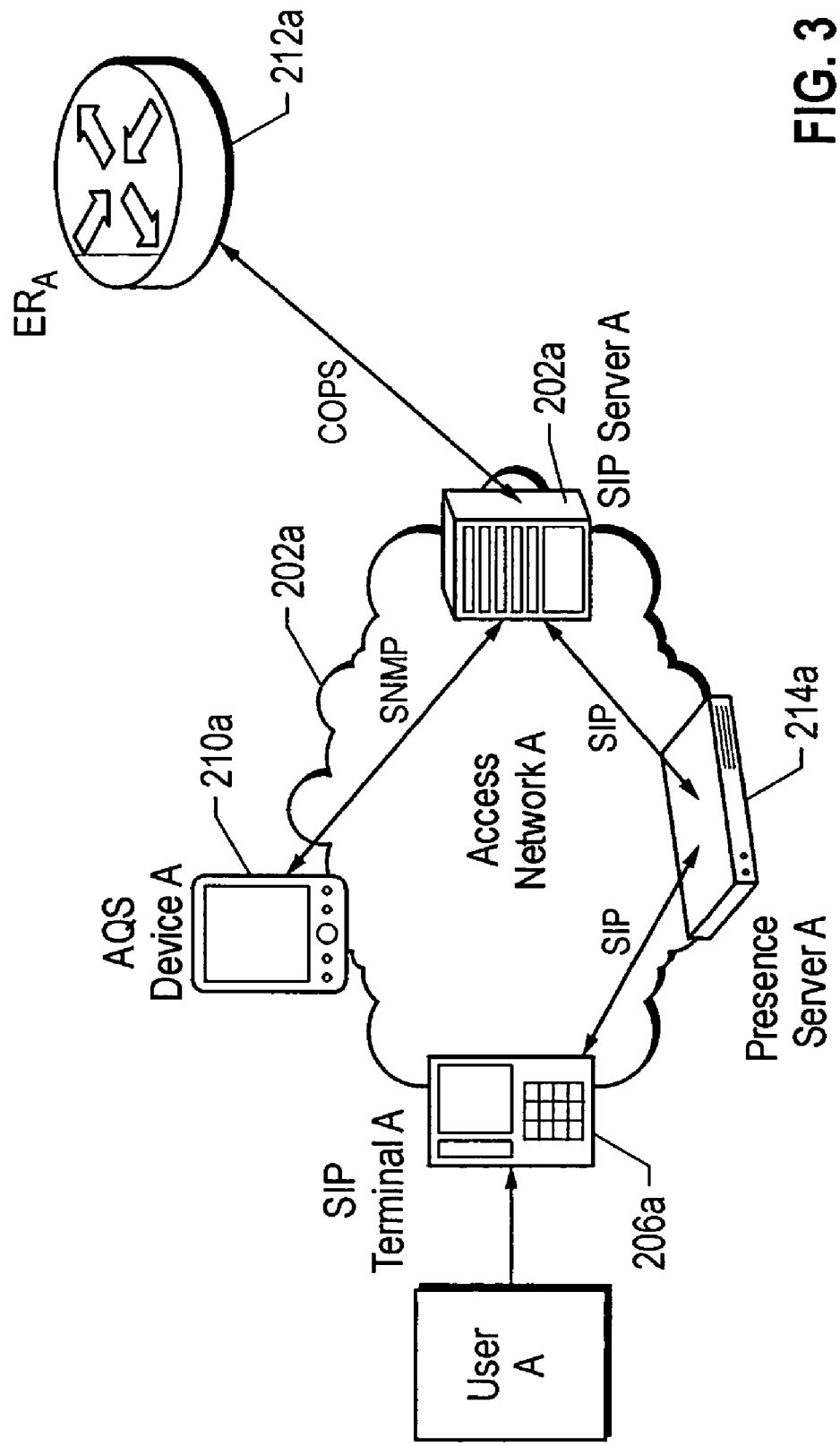
FIG. 3 depicts interactions for collecting network QoS information in the scenario of FIG. 2.

FIG. 3 illustrates interaction for collecting QoS information for the access network 202a. It will be recognized that, although interaction for collecting QoS information for only the access network 202a is shown and described, the same interaction applies to the access network 202b. Referring now to FIGS. 2 and 3, at the access network 202a, the presence server 214a develops the network QoS capability attribute of User A from interactions involving the presence server 214a, the enhanced SIP proxy server 208a, the AQS device 210a, and the ER 212a. The developed presence attribute of User A can be represented using different methods. One straightforward method is to define a technique that creates a match between the integral QoS characterization of the network 202a and the AQS device 210a corresponding to application services and QoS presence attributes of User A.

AQS tools that are currently commercially available typically define VoIP capability only; however, it is anticipated that future products will indicate clearly QoS capabilities for interactive multimedia, video-streaming, voice, and just data applications. Hence, one possible method of showing the network QoS attribute of a user, such as User A, to its "buddies" might be to develop codes, such as a color scheme, that illustrate the capabilities of User A in terms of interactive multimedia (e.g., for on-line gaming), video-streaming (e.g., for video broadcasting), voice (e.g., for VoIP), and best effort (e.g., for data).

Figure 4:
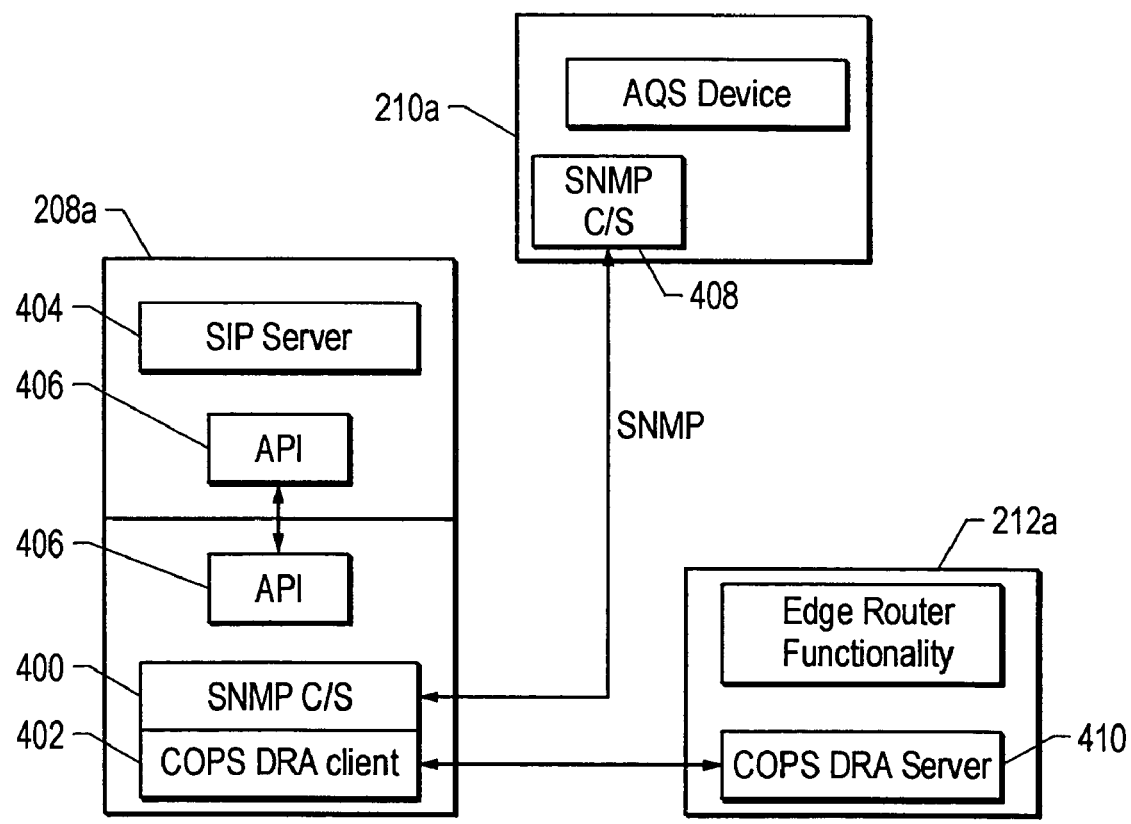
FIG. 4 depicts a message exchange process between an enhanced proxy server, an AQS device, and an edge router.

As illustrated in FIG. 3, communications between the SIP terminal 206a, presence server 214a, and enhanced SIP proxy server 208a are SIP-based. Communications between the AQS device 210a and the enhanced SIP proxy server 208a can be Simple Network Management Protocol ("SNMP")-based. Communications between the ER 212a and the enhanced proxy server 208a can be Common Open Policy Service protocol ("COPS")-based. Finally, as illustrated in FIG. 4, an SNMP client/server ("C/S") 400 and a COPS usage for DiffServ Resource Allocation ("COPS DRA") client 402 that enhance core SIP proxy server functionality 404 can exist as processes outside of the core functionality. As shown in FIG. 4, the core functionality 404 communicates with these processes 400, 402, processes through Application Program Interfaces ("APIs") 406.

As best illustrated in FIG. 4, typically, the enhanced SIP proxy server 208*a* sends inquiries about the state of QoS in the access network 202*a* through SNMP-based messaging (via the SNMP C/S 400) to an SNMP C/S 408 in the AQS device 210*a*. Alerts are communicated back to the server 208*a* from the device 210*a* in the reverse direction. The enhanced SIP proxy server 208*a* also sends COPS-based messages (via the COPS DRA client 402) to a COPS DRA server 410 of the ER 212*a* of the converged IP network 204 (FIG. 2) to probe for QoS policy indicators. This is not necessary to indicate QoS capability of the access network 202*a*. However, in a situation where the converged IP network 204 is QoS-enabled through a differentiated services ("DiffServ") cloud or a cascade of such clouds, the QoS information for the converged IP network can be accessed from the ER 212*a* and/or from some such central entity, such as a bandwidth broker, that controls the DiffServ cloud. This additional information can be used to indicate not only the condition of the access network 202*a*, but also the end-to-end QoS condition of User A. In particular, the enhanced SIP proxy server 208*a* sends the QoS state of the access network 202*a* and of the converged IP network 204, if available, to the presence server 214*a* using SIP. The presence server 214*a* then will indicate the network QoS capability of User A to the watcher in User B per the code or color scheme mentioned above using SIP.

Figure 5:
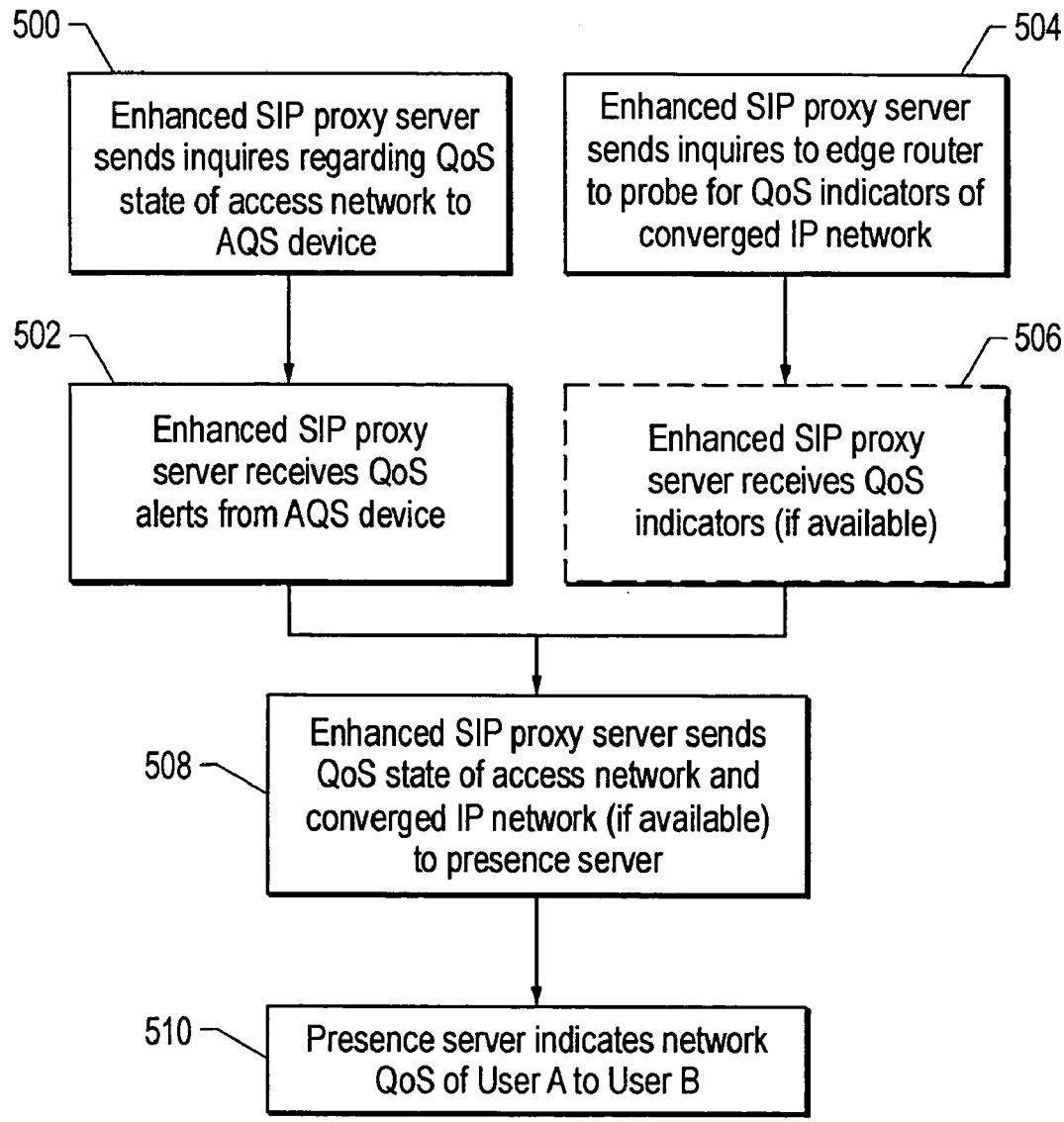
FIG. 5 depicts a flowchart of the interactions for collecting network QoS information as illustrated in FIG. 3.

FIG. 5 is a flowchart illustrating operation of the illustrated embodiments for collecting network QoS information in the scenario of FIG. 2. In particular, collection of network QoS information for User A will be described for purposes of illustration. In step 500, the enhanced SIP proxy server 208*a* sends SNMP messages to the AQS device 210*a* to inquire as to the QoS state of the access network 202*a*. In step 502, the enhanced SIP proxy server 208*a* receives QoS alerts from the AQS device 210*a* in response to the inquiries. In step 504, the enhanced SIP proxy server sends COPS messages to the ER 212*a* to probe for QoS indicators with respect to the converged IP network 204. In optional step 506, the enhanced SIP proxy server 208*a* receives a response from the ER 212*a* advising of the QoS indicators of the converged IP network 204 (if available).

In step 508, the enhanced SIP proxy server 208*a* sends the QoS state of the access network 202*a* and of the converged IP network 204 (if available) to the presence server 214*a* using SIP-based messaging. In step 510, the presence server 214*a* indicates the network QoS of User A to User B using SIP-based messaging.

As a result, prior knowledge of the available of network QoS is available to a user (in the illustrated example, User B) before he decides to launch a QoS-sensitive application. Based on this knowledge, the user can decide to communicate with the other end using a matching QoS capability.

It is believed that the operation and construction of the present invention will be apparent from the Detailed Description set forth above. While the exemplary embodiments of the invention shown and described have been characterized as being preferred, it should be readily understood that various changes and modifications could be made therein, e.g., using other presence-enabled protocols such as H.323 and H.323-compliant servers, etc., without departing from the scope of the present invention as set forth in the following claims.

What is claimed is:

1. An access network for providing quality of service ("QoS") information of the access network, the access network comprising:

an Application Quality of Service ("AQS") device that controls QoS parameters for the access network;

a presence server that develops a QoS attribute of an end-user of the access network by collecting QoS attributes of the access network from the AQS device and collecting QoS attributes of an end-user device; and a server that communicates with the presence server to collect the QoS attribute of the end-user and communicates the QoS attribute to an edge router of another access network.

2. The access network of claim 1 wherein communications between the end user, the presence server, and the server take place using SIP.

3. The access network of claim 1 wherein communications between the AQS device and the server take place using Simple Network Management Protocol ("SNMP").

4. The access network of claim 1 wherein communications between the edge router and the server take place using Common Open Policy Service protocol ("COPS").

5. The access network of claim 1 wherein the server comprises a Simple Network Management Protocol ("SNMP") client/server ("C/S").

6. The access network of claim 5 wherein core SIP server functionality of the server communicates with the SNMP C/S via an Application Program Interface ("API").

7. The access network of claim 1 wherein the server comprises a Common Open Policy Services protocol ("COPS") client.

8. The access network of claim 7 wherein core SIP server functionality of the SIP server communicates with the COPS client via an Application Program Interface ("API").

9. A method of providing quality of service ("QoS") information of an access network, the method comprising:

collecting QoS attributes of the access network from an Application Quality of Service ("AQS") device that controls QoS parameters for the access network;

collecting QoS attributes of an end-user device;

developing a QoS attribute of an end-user of the access network using the collected QoS attributes; and communicating the developed QoS attribute of the end-user to an edge router of another access network.

10. The method of claim 9 wherein the collecting QoS attributes of the access network from the AQS device is performed using Simple Network Management Protocol ("SNMP").

11. The method of claim 9 wherein the collecting QoS attributes of an end-user device is performed using Session Initiation Protocol ("SIP").

12. The method of claim 9 wherein the communicating the developed QoS attribute of the end-user to an edge router of another access network is performed using Common Open Policy Service protocol ("COPS").

13. A system for providing quality of service ("QoS") information of an access network, the system comprising:

means for collecting QoS attributes of the access network from an Application Quality of Service ("AQS") device that controls QoS parameters for the access network;

means for collecting QoS attributes of an end-user device;

means for developing a QoS attribute of an end-user of the access network using the collected QoS attributes; and means for communicating the developed QoS attribute of the end-user to an edge router of another access network.

14. The system of claim 13 wherein the means for collecting QoS attributes of the access network from the AQS device employs Simple Network Management Protocol ("SNMP").

15. The system of claim 13 wherein the means for collecting QoS attributes of an end-user device employs Session Initiation Protocol ("SIP").

16. The system of claim 13 wherein the means for communicating the developed QoS attribute of the end-user to an edge router of another access network employs Common Open Policy Service protocol ("COPS").

17. The system of claim 1 wherein the means for collecting QoS attributes of the access network from the AQS device employs Simple Network Management Protocol ("SNMP") comprises an SIP server.

18. The system of claim 17 wherein the SIP server comprises an SNMP client/server ("C/S").

19. The system of claim 1 wherein the means for communicating the developed QoS attribute of the end-user to an edge router of another access network employs comprises an SIP server.

20. The system of claim 19 wherein the SIP server comprises a COPS client.

21. A Session Initiation Protocol ("SIP") server for providing quality of service ("QoS") information of an access network comprising:

core SIP server functionality;
a Simple Network Management Protocol ("SNMP") client/server ("C/S") for communicating with the core SIP server functionality; and
a Common Open Policy Services protocol ("COPS") client for communicating with the core SIP server functionality.

22. The SIP server of claim 21 wherein the core SIP server functionality communicates with the SNMP C/S via an Application Program Interface ("API").

23. The SIP server of claim 21 wherein the core SIP server functionality communicates with the COPS client via an Application Program Interface ("API").

24. The SIP server of claim 21 wherein the SIP server collects QoS attributes of the access network from an AQS device using SNMP.

25. The SIP server of claim 21 wherein the SIP server collects QoS attributes of an end-user device using Session Initiation Protocol ("SIP").

26. The SIP server of claim 21 wherein the SIP server communicates a QoS attribute of the end-user developed from the collected QoS attributes to an edge router of another access network using Common Open Policy Service protocol ("COPS").

* * * * *